April 1, 1958 G. V. PLUMLEY ET AL 2,828,842
TRAILER CABANA
Filed Dec. 8, 1953 3 Sheets-Sheet 1
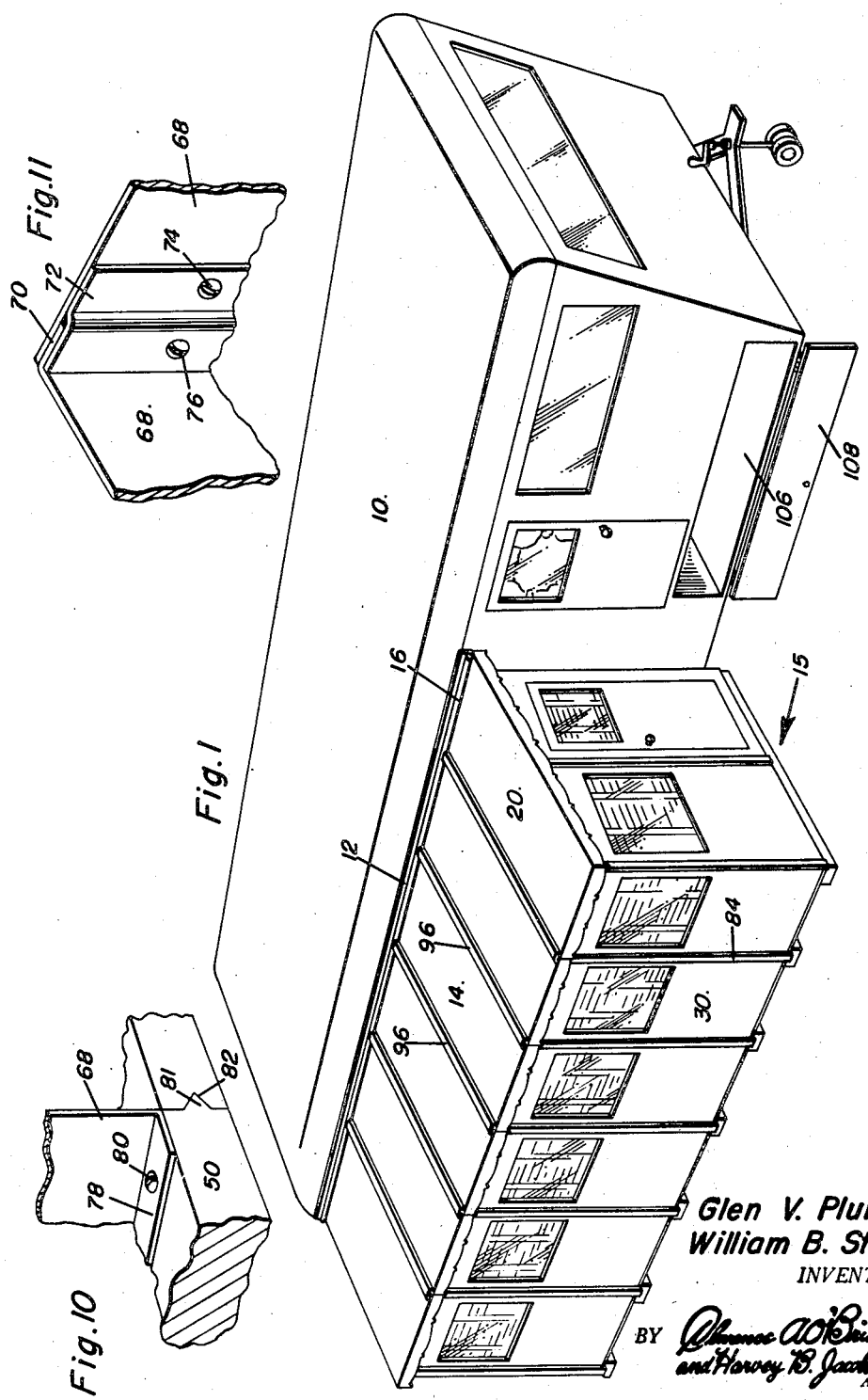
Glen V. Plumley
William B. Stevens
INVENTORS April 1, 1958  G. V. PLUMLEY ET AL  2,828,842
TRAILER CABANA
Filed Dec. 8, 1953  3 Sheets-Sheet 2
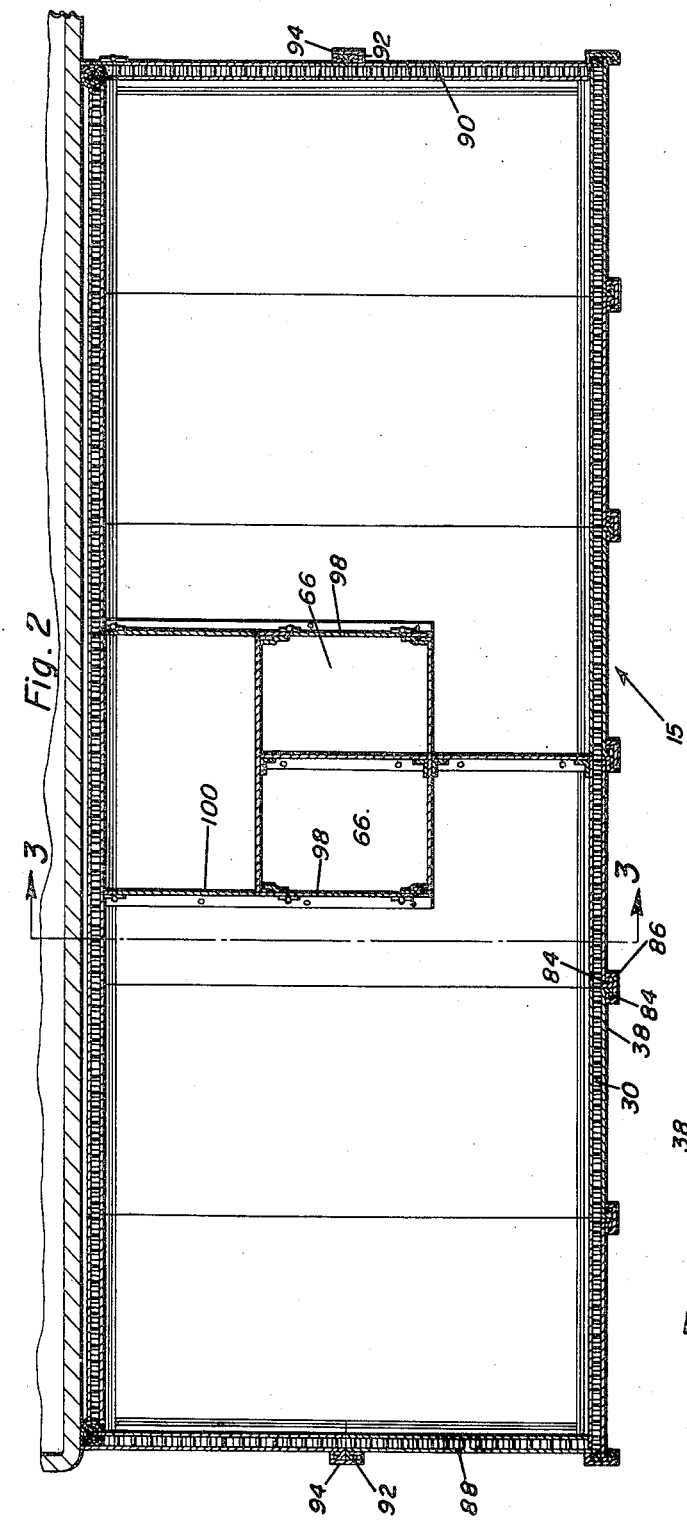
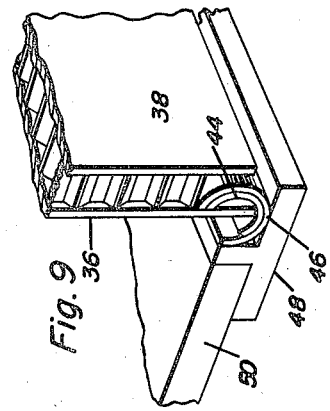
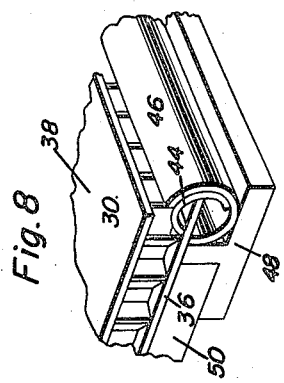
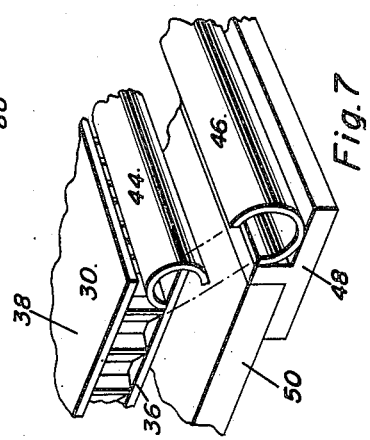
Glenn V. Plumley
William B. Stevens
INVENTORS
BY Clarence A. O'Brien
and Harvey B. Jacobson
Attorneys

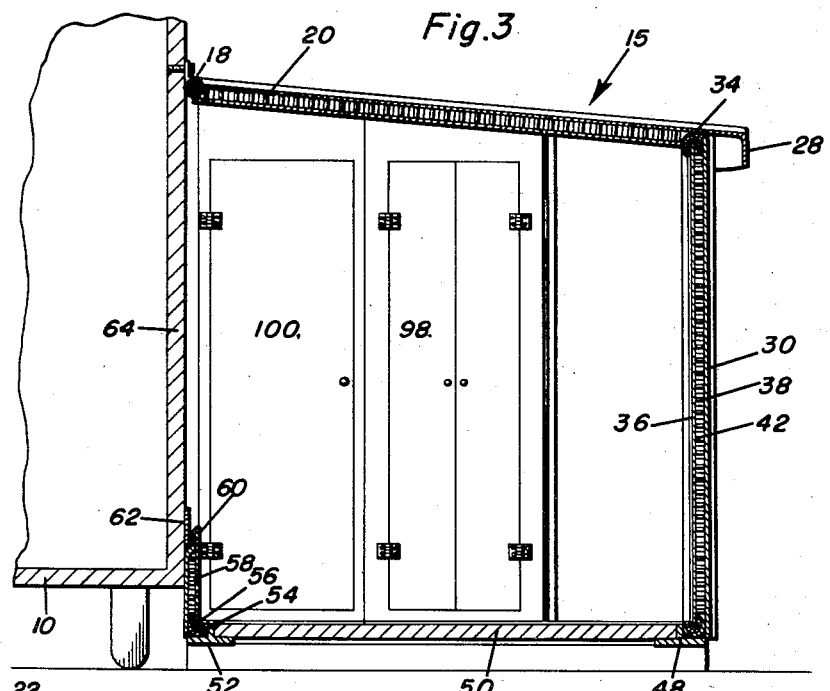
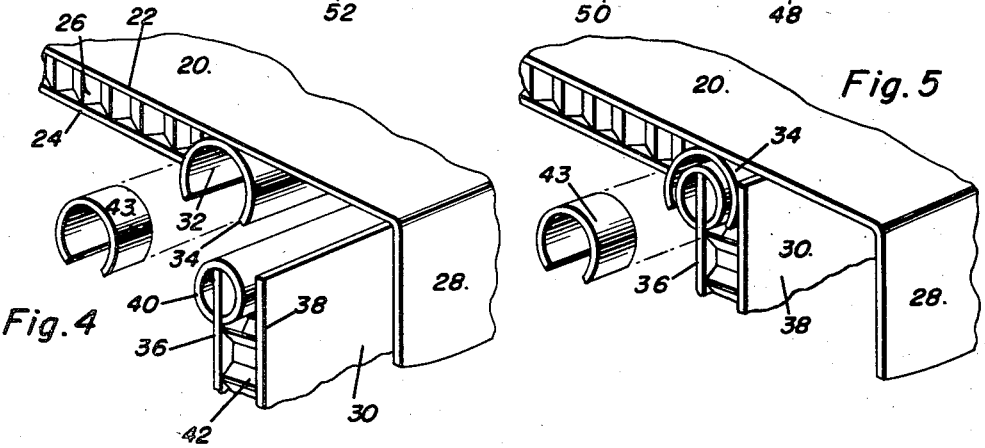
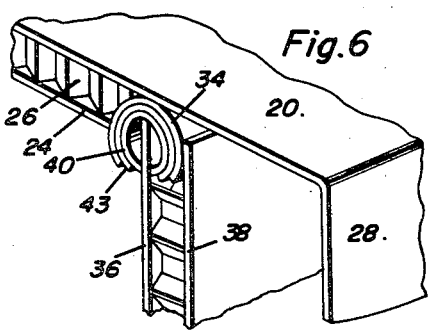
Glenn V. Plumley
William B. Stevens
INVENTORS

United States Patent Office 2,828,842
Patented Apr. 1, 1958

2,828,842

TRAILER CABANA

Glenn V. Plumley and William B. Stevens, Lomita, Calif.

Application December 8, 1953, Serial No. 396,960

3 Claims. (Cl. 189—36)

This invention relates to the class of land vehicles and more particularly to a novel cabaña for use in conjunction with a trailer.

The primary object of this invention resides in the provision of a cabaña for a trailer which is adapted to provide additional living space for the occupants of the trailer thereby adding to the comfort and enjoyment of the occupants of the trailer.

One of the particular features of the invention resides in the means utilized for rapidly connecting and disconnecting the various elements of the invention. The cabaña is constructed from a plurality of roof, wall and floor panels, each of which may be joined together, prior to the connection between the individual elements of the trailer being made or alternatively the cabaña may be erected by connecting the panels of the roof, wall and floor in sections and then connecting the sections together.

Incorporated in the invention is a novel connection between a roof panel and a wall panel which includes an arcuate key receivable between a cylindrical retainer and a cylindrical insert member, the key being coaxial with both the insert member and the retainer. A connection between the floor and side wall panels is utilized which consists of an insert member of tubular configuration which is received with a retainer likewise of tubular configuration having a slot therein. The tubular retainer and the insert member each have slots therein thus forming the tubular members whereby the insert member may be received in the retainer when the insert member is positioned at an initial angle relative thereto. However, when the insert member is rotated relative to the retainer it then cannot be removed therefrom.

Still further objects and features of this invention reside in the provision of a cabaña for a trailer that may be constructed from lightweight panel of good insulative and strength characteristics, which is simple and speedy to erect or dismember, which may be easily attached to most makes and models of commercial trailers, and which trailer cabaña is very attractive in appearance.

These, together with the various ancillary objects and features of the invention which will become apparent as the following description proceeds, are attained by this trailer cabaña, a preferred embodiment of which has been illustrated in the accompanying drawings, by way of example only, wherein:

Figure 1 is a perspective view of the trailer cabaña as shown associated with a trailer;

Figure 2 is a horizontal sectional view of the trailer cabaña showing one form of interior plan thereof;

Figure 3 is a vertical sectional view as taken along the line 3—3 in Figure 2;

Figures 4, 5 and 6 are perspective views illustrating the manner of attachment of the roof panel and the side panels;

Figures 7 through 9 are perspective views illustrating the various steps of assembly of the side panels and floor panel;

Figure 10 is a perspective view illustrating the connection between a partition and one of the floor panels; and Figure 11 is a partial perspective view illustrating the joint between the intersecting partition panels.

With continuing reference to the accompanying drawings wherein like reference numerals designate similar parts throughout the various views, reference numeral 10 generally designates a trailer of conventional construction which may be any one of the various makes and models presently commercially available. Secured to the trailer 10 at one side thereof and adjacent the top is an elongated bracket 12 which is adapted to support the roof panels 14 of the trailer cabaña generally indicated by reference numeral 15. The bracket 12 includes a cylindrical retainer 16 having a slat therein adapted to receive the cylindrical insert members 18 secured to the roof panels 20. This can be best seen in Figures 4 through 6, each of the roof panels 20 include upper and lower plates 22 and 24, respectively, which are separated by a honeycomb 26 which provides means for forming dead air spaces between the inner and outer panels 22 and 24 thus enhancing the thermal characteristics of the panels while providing additional strength thereto. The roof panels 22 each have a flange 28 attached thereto which is adapted to overhang the side panels 30 of the cabaña 15. The flange 28 is preferably integrally formed with the upper plate 22. Secured to the roof panel 20 is a cylindrical tubular retainer 32 which is provided with a slot, as at 34, therein extending throughout the entire length of the tubular retainer 32 thus cutting the retainer 32 to form a body of more than semi-cylindrical configuration. The side panels 30 are formed of inner and outer plates as at 36 and 38 and a tubular cylindrical insert member 40 is carried by the inner plate 36 of each of the panels 30. This tubular insert member 40 may be readily received through the slot 34. Arcuate key members 43 are utilized to lockingly connect the side panels 30 to the roof panels 20, the arcuate key members 43 being insertable between the insert member 40 and the retainer 32 thus preventing the relative freedom of movement of the insert member 40 and the retainer 32 and lockingly holding the side panel 30 relative to the roof panel 20. The insert member 42 is coaxial with the insert member 40 and the retainer 32. The various stages of assembly of the roof panel 20 and the side panels 30 can be readily seen in Figures 4 through 6 and it will be noted that the keys 43 are slid in from the side to lockingly hold the insert member 40 within the retainer 32.

The side plates 36 and 38 are connected by a honeycomb 42 similar to the honeycomb 26 and at the bottom edges of the side panels 30 there is secured an insert member 44 which is of arcuate elongated tubular shape and which has a cutaway portion leaving the insert 44 as a body of more than semi-cylindrical configuration. This insert member 44 is adapted to be received within a tubular and cylindrical retainer 46 carried by a key-shaped member 48 which is secured to the floor panel 50 of the cabaña 15. It will be noted that when the side panel 30 is in a horizontal position relative to the floor panel 50 the insert member 44 may be readily inserted in the retainer 46. Since the upper plate 38 of the side panel 30 is shorter than the inner plate 36, the side panel 30 may be readily rotated to an upright position at which time it is not possible to remove the insert member 44 from the retainer 46 since the radius of the insert member 44 is more than one-half the width of the slot in the retainer 46.

It is noted that the T-shaped member 48 is so arranged that the retainer 46 is nested therein while the T-shaped member provides means for supporting the floor panel 50 above the ground. Likewise, the T-shaped member 48 forms the outer ends of the floor panels 50. It is to be noted that the floor panels 50 have other T-shaped members 52 attached thereto which carry retainers 54, as can be best seen in Figure 3, which are adapted to retain insert members 56 carried by partial extension wall panels 58 which carry hooks 60 adapted to engage brackets 62 mounted below the brackets 18 and adjacent the bottom of the trailer 10. This extension 58 thereby insures that the wall 64 of the trailer 10 is utilized as one of the walls of the cabaña 15.

The cabaña 15 may be provided with any suitable interior configuration or internal arrangement as may be desired. However, if it is desired to provide partitions for closets as at 66, the partition walls as are illustrated in Figures 10 and 11 can be utilized. These partition walls are arranged so that the joints thereof provide means for rapid assembly. Each of the partition walls 68 may be provided with either flanges 70 or substantially S-shaped connectors 72 which are bolted or otherwise attached as at 74 to the partition walls 68. The flanges are received between the ends of the adjacent panel 68 and the S-shaped members 72 thereby effecting a relatively rigid assembly. Bolts or other fasteners 76 may be utilized and may extend through the S-shaped members 72, the flanges 70 and the partition panel 68 to which the S-shaped member 72 is attached, thereby clampingly holding the flanges 70 in position. The bottom of the partition 68 may be provided with flanges, as at 78, which may then be bolted or otherwise fastened as at 80 to the floor panels 50. It is noted that the central floor panels may be provided with an interlocking tongue and groove 81 and 82, respectively.

In assembling the side panels 30 of the cabaña together it will be noted that the outer plates 38 are provided with substantially L-shaped panels as at 84 and channel-shaped members 86 embrace the L-shaped flanges 84 of adjacent panels 30 to lockingly hold these panels in assembled relation. It is to be noted that the side walls 88 and 90 of the cabaña 15 are constructed from panels having flanges 92 of a similar L-shaped configuration and other channel-shaped members 94 are utilized to hold these end walls in an assembled relationship. The roof panels 20 are likewise provided with flanges of similar L-shaped characteristics so that channel-shaped members as at 96 can be utilized to hold these panels in their assembled relation.

Doors as at 98 can be provided for the closet areas 66 and other doors 100 can be provided for permitting passage from one room to another as may be desired.

It is noted that a space 106 closed by a door 108 may be provided for receiving the components of the cabaña 15 when such is disassembled.

Since from the foregoing the construction and advantages of this trailer cabaña are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. In a trailer cabaña, a joint for a floor panel and a side panel comprising a horizontal cylindrical retainer having an elongated slot therein, said retainer being connected to said floor panel, an arcuate insert member receivable in said slot when said insert member is positioned at an initial angular relationship relative to said retainer but being incapable of being removed after said insert member had been rotated relative to said retainer, said insert member being attached to said side panel, said side panel being constructed from spaced plates, said insert member being of cylindrical tubular configuration with a longitudinal slot therein forming longitudinal faces, said insert member having one of said faces attached to the inner surface of one of said spaced plates with the other face extending outwardly of said one of said spaced plates.

2. In a trailer cabaña, a joint for a floor panel and a side panel comprising a horizontal cylindrical retainer having an elongated slot therein, an arcuate insert member received in said slot when said insert member is positioned at an initial angular relationship relative to said retainer but being incapable of being removed after said insert member had been rotated relative to said retainer, said insert member being attached to said side panel, a T-shaped member secured to said floor panel, said retainer being carried by said T-shaped member.

3. A joint for a floor panel and a side panel comprising a floor panel, a side panel, a T-shaped member secured to said floor panel and having a flat lower surface extending below said floor panel, a cylindrical retainer carried by said T-shaped member, said retainer having an elongated slot therein, an arcuate insert member receivable in said slot when said insert member is positioned at an initial angular relationship relative to said retainer but being incapable of being removed after said insert member had been rotated relative to said retainer, said insert member being attached to said side panel, said side panel being constructed from spaced plates, said insert member being of cylindrical tubular configuration with a longitudinal slot therein forming longitudinal faces, said insert member having one of said faces attached to the inner surface of one of said spaced plates with the other face extending outwardly of said one of said spaced plates.

References Cited in the file of this patent

UNITED STATES PATENTS

| | | |
|---|---|---|
| 730,275 | Laswell | June 9, 1903 |
| 1,907,119 | Reynolds | May 2, 1933 |
| 2,104,648 | Hickey | Jan. 4, 1938 |
| 2,293,020 | Lundvall | Aug. 11, 1942 |
| 2,321,118 | Zechiel | June 8, 1943 |